United States Patent
Wan et al.

(10) Patent No.: US 12,309,313 B2
(45) Date of Patent: May 20, 2025

(54) DEVICE CONTROL METHOD AND APPARATUS, DEVICE, AND STORAGE MEDIUM

(71) Applicant: Beijing Zitiao Network Technology Co., Ltd., Beijing (CN)

(72) Inventors: Shiqi Wan, Beijing (CN); Zhenyu Yue, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/769,127

(22) Filed: Jul. 10, 2024

(65) Prior Publication Data

US 2024/0364809 A1    Oct. 31, 2024

Related U.S. Application Data

(63) Continuation of application No. PCT/CN2023/081266, filed on Mar. 14, 2023.

(30) Foreign Application Priority Data

Mar. 31, 2022   (CN) .......................... 202210344823.0

(51) Int. Cl.
  *G06F 21/31* (2013.01)
  *G06F 11/34* (2006.01)
  *H04M 1/72463* (2021.01)
(52) U.S. Cl.
  CPC ... *H04M 1/724631* (2022.02); *G06F 11/3438* (2013.01); *G06F 21/31* (2013.01)
(58) Field of Classification Search
  CPC .................................. H04M 1/72; G06F 21/31
  See application file for complete search history.

(56) References Cited

U.S. PATENT DOCUMENTS

| | | | |
|---|---|---|---|
| 6,002,386 A | 12/1999 | Gu | |
| 2005/0054324 A1* | 3/2005 | Chmaytelli | H04M 15/06 455/406 |
| 2015/0358356 A1* | 12/2015 | Diaz-Tellez | G06F 21/6218 726/1 |

FOREIGN PATENT DOCUMENTS

| | | |
|---|---|---|
| CN | 102542739 A | 7/2012 |
| CN | 103442127 A | 12/2013 |

(Continued)

OTHER PUBLICATIONS

International Search Report for PCT/CN2023/081266, mailed May 5, 2023, 6 pages.

(Continued)

*Primary Examiner* — Michael T Vu
(74) *Attorney, Agent, or Firm* — Astute IP Law Group (57) ABSTRACT

The present disclosure provides a device control method and apparatus, a device, and a storage medium. The method comprises: in the running process of a target application program, if it is determined that device use time information of the current user meets a preset blocking trigger condition, displaying a preset blocking page on the current running interface of the target application program, wherein the preset blocking page is used for blocking a trigger operation for the current running interface, and an authentication control is provided on the preset blocking page; in response to a trigger operation for the authentication control, authenticating the current user; and once it is determined that the authentication of the current user succeeds, closing the preset blocking page.

18 Claims, 5 Drawing Sheets

```
during a target application runs, in response to it is
determined that device usage time information of a         ── S101
current user meets a preset blocking trigger condition,
displaying a preset blocking page on a current operation
         interface of the target application
                         │
                         ▼
   in response to a trigger operation on the authentication
           control, authenticating the current user          ── S102
                         │
                         ▼
   in response to it is determined that the authentication of  ── S103
        the current user is successful, closing the preset
                      blocking page
```

(56) References Cited

FOREIGN PATENT DOCUMENTS

| | | | |
|---|---|---|---|
| CN | 103473015 A | 12/2013 |
| CN | 105677174 A | 6/2016 |
| CN | 106126147 A | 11/2016 |
| CN | 108881975 A | 11/2018 |
| CN | 109062632 A | 12/2018 |
| CN | 110782635 A | 2/2020 |
| CN | 112370792 A | 2/2021 |
| CN | 113536183 A | 10/2021 |
| EP | 1845692 B1 | 7/2008 |
| JP | 2011035499 A | 2/2011 |
| JP | 6736766 B2 | 8/2020 |

OTHER PUBLICATIONS

Notice of First Examination Opinion for Chinese Patent Application No. 202210344823.0, mailed on Dec. 9, 2024, 7 pages.
Extended European Search Report for European Patent Application No. 23777821.2, mailed on Mar. 17, 2025, 7 pages.

\* cited by examiner

DEVICE CONTROL METHOD AND APPARATUS, DEVICE, AND STORAGE MEDIUM

CROSS-REFERENCE TO RELATED APPLICATIONS

The present application is a continuation application of PCT/CN2023/081266 filed Mar. 14, 2023, which claims priority to and is based on a Chinese application with an application number 202210344823.0 and a filing date of Mar. 31, 2022, the aforementioned applications both are hereby incorporated by reference in their entireties.

FIELD OF THE INVENTION

The present disclosure relates to the field of data processing, and in particular to a device control method, apparatus, device and storage medium.

BACKGROUND

With the rapid development of information technology, the emergence of smart terminals such as mobile phones, computers, and tablets has enriched people's lives and brought many conveniences to people's lives. However, if without restraint, usage of such smart terminals would easily affect people's work and life adversely. Therefore, anti-addiction reminder software came into being.

DISCLOSURE OF THE INVENTION

In order to solve the above technical problems, embodiments of the present disclosure provide an improved device control method, apparatuses and device.

In a first aspect, the present disclosure provides a device control method, the method including:
  during a target application runs, in response to it is determined that device usage time information of a current user meets a preset blocking trigger condition, displaying a preset blocking page on a current operation interface of the target application; wherein the preset blocking page is used to block a trigger operation on the current operation interface, and an authentication control is disposed on the preset blocking page;
  in response to a trigger operation on the authentication control, authenticating the current user;
  in response to it is determined that the authentication of the current user is successful, closing the preset blocking page.

According to embodiments of the present disclosure, the method may further include:
  in response to it is determined that the authentication of the current user fails, displaying authentication failure notification information on the preset blocking page.

According to embodiments of the present disclosure, wherein the preset blocking page displays blocking cut-off time information thereon, and the method further comprises:
  in response to it is determined that the current user meets a preset blocking cut-off condition, closing the preset blocking page; wherein there is a corresponding relationship between the preset blocking cut-off condition and the blocking cut-off time information.

According to embodiments of the present disclosure, wherein the preset blocking cut-off condition includes that a blocking duration reaches a preset first duration threshold and/or a current time reaches a preset blocking cut-off time.

According to embodiments of the present disclosure, the device usage time information includes at least one of a cumulative device usage duration, a single continuous device usage duration, and a device usage time; the preset blocking trigger condition includes at least one of the cumulative device usage duration reaching a preset second duration threshold, the single continuous device usage duration reaching a preset third duration threshold, and the device usage time falling within a preset usage time range.

According to embodiments of the present disclosure, the method may further include:
  in response to it is determined that the current user is an application APP uninstall-reinstall login user or a change-device login user, then judging whether the current user is in a blocked state; wherein the blocked state is used to represent a state entered in response to the device usage time information of the current user meets the preset blocking trigger condition;
  in response to it is determined that the current user is in the blocked state, displaying the preset blocking page, and hiding the authentication control disposed on the preset blocking page.

In a second aspect, the present disclosure provides a device control apparatus, the apparatus includes:
  a first display module configured to, during a target application runs, in response to it is determined that device usage time information of a current user meets a preset blocking trigger condition, display a preset blocking page on a current operation interface of the target application; wherein the preset blocking page is used to block a trigger operation on the current operation interface, and an authentication control is disposed on the preset blocking page;
  an authentication module configured to, in response to a trigger operation on the authentication control, authenticate the current user; and
  a first closing module configured to, in response to it is determined that the authentication of the current user is successful, close the preset blocking page.

In a third aspect, the present disclosure provides a computer-readable storage medium having instructions stored thereon, wherein the instructions, when running on a terminal device, causes the terminal device to implement the method described above.

In a fourth aspect, the present disclosure provides a device control device, comprising: a memory, a processor, wherein the memory stores computer programs thereon; wherein the computer programs, when executed by the processor, cause the device control device to implement the method described above.

In a fifth aspect, the present disclosure provides a computer program product having computer programs/instructions, wherein the computer programs/instructions, when executed by a processor, causes implementation of the method described above.

In a sixth aspect, the present disclosure provides a computer program comprising program codes, which, when executed by a processor, cause implementation of the method described above.

DESCRIPTION OF THE DRAWINGS

The accompanying drawings, which are incorporated in and constitute a part of this specification, illustrate embodiments consistent with the present disclosure and, together with the description, serve to explain the principles of the present disclosure.

In order to more clearly illustrate the embodiments of the present disclosure or the technical solutions in the prior art, the drawings used in the description of the embodiments, or the prior art will be briefly described below, and obviously, those ordinary skilled in the art may obtain other drawings based on the accompanying drawings without creative efforts.

DETAILED DESCRIPTION OF PREFERRED EMBODIMENTS

In order to understand the above objects, features and advantages of the present disclosure more clearly, the solutions of the present disclosure will be further described below. It should be noted that, in the case of no conflict, the embodiments of the present disclosure and the features in the embodiments may be combined with each other.

Many specific details are set forth in the following description to fully understand the present disclosure, but the present disclosure may also be implemented in other manners different from those described herein; obviously, the embodiments in the specification are only a part of the embodiments of the present disclosure, rather than all of the embodiments.

At present, with the rapid development of information technology, the emergence of smart terminals such as mobile phones, computers, and tablets has enriched people's lives and brought many conveniences to people's lives. However, if without restraint, usage of such smart terminals would easily affect people's work and life adversely. Therefore, anti-addiction reminder software came into being. In the related technologies, anti-addiction reminders are relatively simple, not flexible enough, and cannot meet the needs of users to prevent addiction.

To this end, the present disclosure provides a device control method, during a target application runs, in response to it is determined that device usage time information of a current user meets a preset blocking trigger condition, then a preset blocking page is displayed on a current operation interface of the target application; wherein the preset blocking page is used to block a trigger operation on the current operation interface, and an authentication control is disposed on the preset blocking page. In response to a trigger operation on the authentication control, the current user is authenticated; and in response to it is determined that the authentication of the current user is successful, the preset blocking page is closed.

Figure 1:
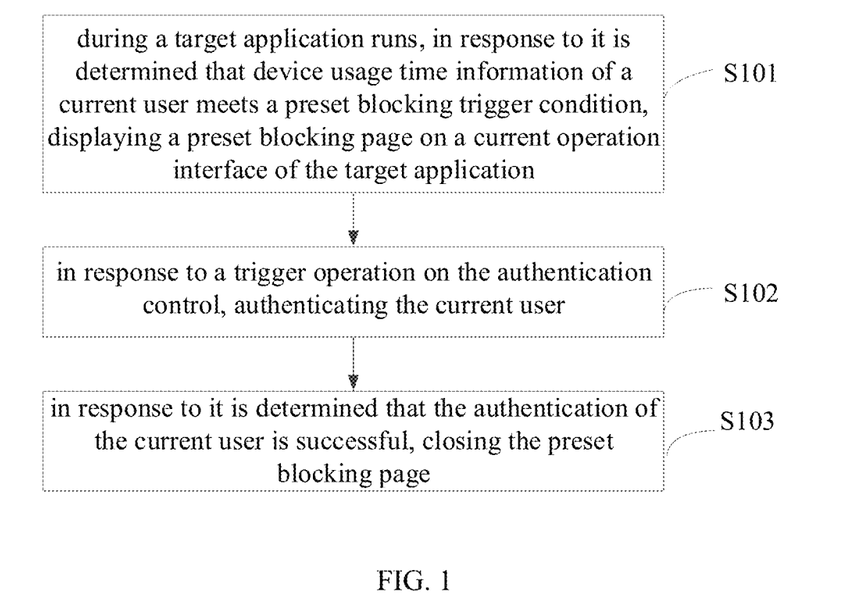
FIG. 1 is a flow chart of a device control method provided by an embodiment of the present disclosure.

The following describes a device control method according to an embodiment of the present disclosure with reference to FIG. 1, which is a flow chart of a device control method according to an embodiment of the present disclosure. The method includes:

S101: during a target application runs, in response to it is determined that device usage time information of a current user meets a preset blocking trigger condition, displaying a preset blocking page on a current operation interface of the target application.

Wherein, the preset blocking page is used to block a trigger operation on the current operation interface of the target application, and an authentication control is disposed on the preset blocking page.

The authentication control is used to authenticate the current user; the device usage time information includes at least one of a cumulative device usage duration, a single continuous device usage duration, and a device usage time; the preset blocking trigger condition includes at least one of the cumulative device usage duration reaching a preset second duration threshold, the single continuous device usage duration reaching a preset third duration threshold, and the device usage time falling within a preset usage time range.

The device control method provided in the embodiment of the present disclosure is used to control the current user's usage time of a target application APP installed on the device, prevent the current user from being addicted to the target APP, and guide the current user to develop a healthy usage habit for the target APP.

During the target APP runs, in response to it is determined that device usage time information of a current user meets a preset blocking trigger condition, a preset blocking page is displayed on a current operation interface of the target APP. Among them, the current operation interface of the target APP is an interface of the target APP that is running in any state, such as a chat interface, a game interface, a video playback interface, etc. of the target APP. The preset blocking page displayed on the current operation interface of the target APP can block the user's triggering operations on the current operation interface. Specifically, if the user triggers an operation, such as clicking and sliding, etc., on the current operation interface of the target APP, the target APP will not respond to the operation. In response to the preset blocking page is closed, the target APP can continue to display the blocked current operation interface, at this time, if a trigger operation from a user on the current operation interface is received, the target APP can respond to the trigger operation based on a preset operation response logic to achieve the normal operation of the target APP.

Assuming that the target APP is a video playback APP, during the process of video playback based on the target APP, in response to it is determined that the current user's device usage time information meets the preset blocking trigger condition, the preset blocking page will be displayed on the current operation interface of the target APP, that is, the video playback interface, at this time, the video playback interface pauses the video playback, and the user cannot implement any operation trigger for the video playback interface, thereby realizing the anti-addiction function for the user with respect to the target APP. In response to the preset blocking page is closed, the video can continue to be played on the video playback interface of the target APP, and the target APP can restore the video playback function to achieve normal operation of the target APP.

In embodiments of the present disclosure, before executing S101, the device usage time information of the current user may be obtained first. As an example, it can trigger to obtain the device usage time information of the current user according to a preset period, so that it can be determined periodically whether the device usage time information of the current user meets the preset blocking trigger condition. Among them, the preset period can be set according to needs, such as being calculated daily, that is, the preset period may be 1 day (24 hours), which will not be limited in the present disclosure.

In embodiments of the present disclosure, the device usage time information obtained may be different depending on different preset blocking trigger conditions, for example, in response to the preset blocking trigger condition is that the cumulative device usage duration reaches a preset second duration threshold, the device usage time information obtained is the cumulative device usage duration of the current user, in response to the cumulative device usage duration of the current user reaches the preset second duration threshold, a preset blocking page is displayed; for another example, in response to the preset blocking trigger condition is that the single continuous device usage duration reaches a preset third duration threshold, the device usage time information obtained is the single continuous device usage duration of the current user, in response to the single continuous device usage duration reaches the preset third duration threshold, the preset blocking page is displayed; for yet another example, in response to the preset blocking trigger condition is that the device usage time falls within a preset usage time range, the device usage time information obtained is the device usage time, in response to the device usage time of the current user falls within the preset usage time range, the preset blocking page is displayed.

It should be noted that the preset second duration threshold, the preset third duration threshold, and the preset usage time range can be set as needed. For example, the preset second duration threshold can be 5 hours, the preset third duration threshold can be 50 minutes, and the preset usage time range can be from 10 p.m. to 6 a.m., the present disclosure does not make any limitations here.

In some embodiments of the present disclosure, in response to it is determined that the device usage time information of the current user meets the preset blocking trigger condition, the preset blocking page is displayed, for example, in response to it is determined that the cumulative device usage duration of the current user reaches 5 hours, the preset blocking page is displayed; in other embodiments, for example, in response to it is determined that the single continuous device usage duration reaches 50 minutes, the preset blocking page is displayed; in still other embodiments, such as in response to it is determined that the device usage time is between 10 p.m. and 6 a.m., the preset blocking page is displayed.

Figure 2:
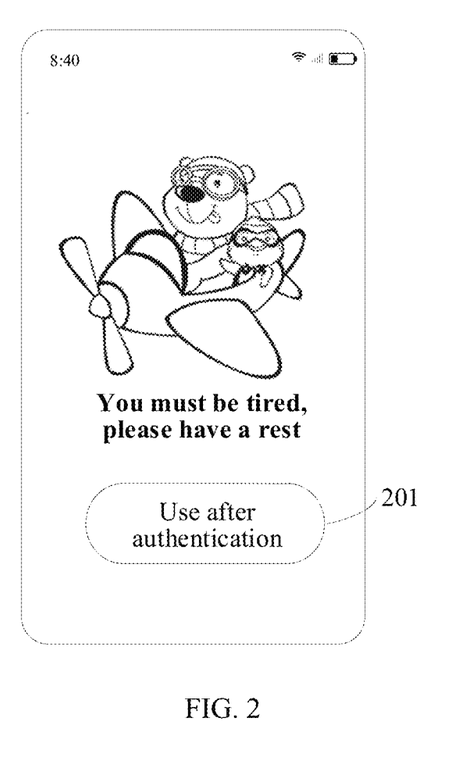
FIG. 2 is a schematic diagram of a preset blocking page provided by an embodiment of the present disclosure.

FIG. 2 is a schematic diagram of a preset blocking page according to an embodiment of the present disclosure. In response to it is determined that the device usage time information of the current user meets the preset blocking trigger condition, the preset blocking page is displayed, and prompt information can be displayed on the preset blocking page, such as "You must be tired, please have a rest", which is used to prompt the current user to have a break, an authentication control 201 is also provided on the preset blocking page, and the current user can be authenticated by triggering the authentication control, so as to determine whether to close the preset blocking page based on the authentication result of the current user.

In response to it is determined that the device usage time information of the current user does not meet the preset blocking trigger condition, the current user can continue to access the target APP.

S102: in response to a trigger operation on the authentication control, authenticating the current user.

In an embodiment of the present disclosure, in response to it is determined that the device usage time information of the current user meets the preset blocking trigger condition, the preset blocking page is displayed, when an operation by the current user clicking the authentication control in the preset blocking page is received, an authentication page can be displayed, and authentication for the current user can be triggered by the current user entering user information on the authentication page, specifically, the user information can be set according to needs, and the present disclosure does not make any limitations here.

In the embodiments of the present disclosure, the operation of triggering the authentication control may include multiple modes, for example, mode 1, triggering a click operation on the authentication control disposed on the preset blocking page, wherein the authentication control can be set at any position on the preset blocking page (such as: the lower right corner, directly below, etc. of the preset page), and the authentication control can be set to any shape (such as: square, circle, etc.); mode 2, triggering a long press operation on the authentication control disposed on the preset blocking page, so as to trigger authentication of the current user.

It should be noted that embodiments of the present disclosure do not limit the specific style and specific location of the authentication control disposed on the above-mentioned preset blocking page.

Figure 3:
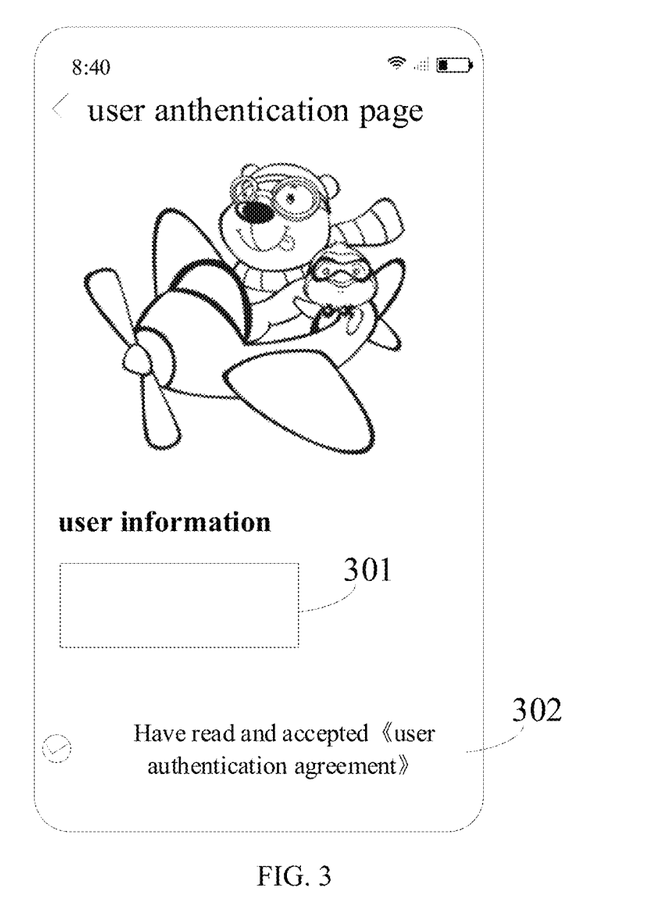
FIG. 3 is a schematic diagram of a user authentication page provided by an embodiment of the present disclosure.

FIG. 3 is a schematic diagram of a user authentication page according to an embodiment of the present disclosure. In response to the authentication control is triggered, a user authentication page is displayed, a user authentication information input control 301 is disposed in the middle of the user authentication page, and the user can input information into the user authentication information input control 301; a user authentication agreement control 302 is disposed at a directly-below position, in response to the user completes the information input, the user authentication agreement control can be triggered first so that a user can understand specific user authentication agreement contents, such as user authentication specifications, user notices, etc., meanwhile, in order to facilitate the user to read the user authentication agreement contents, the specific user agreement contents can be presented in form of a pop-up window, which will not be limited by the present disclosure.

In an actual application, in response to it is determined that the device usage time information of the current user meets the preset blocking trigger conditions, a preset blocking page is displayed, and at this time, the current user cannot continue to use the target APP, if the user needs to continue to use the target APP, the user needs to click the authentication control in the preset blocking page to cause the authentication page to pop up, and the current user performs inputting according to the prompt information in the authentication page, in response to the current user completes information input, the device will send the input information to the authentication server, and the authentication server can authenticate the current user based on the input information and obtain an authentication result, then the authentication server returns the authentication result to the device.

S103: in response to it is determined that the authentication of the current user is successful, closing the preset blocking page.

In an embodiment of the present disclosure, in response to having received a trigger operation on the authentication control, the current user is authenticated, in response to the authentication of the current user is successful, then the preset blocking page is closed, and the current user can continue to use the target APP.

In an embodiment of the present disclosure, in response to it is determined that the authentication of the current user fails, authentication failure notification information can be displayed on a preset blocking page.

In an embodiment of the present disclosure, in response to the authentication of the current user fails, an authentication failure notification message can be displayed on a preset blocking page. The authentication failure notification message may appear in the form of a pop-up window, such as "Authentication failed, please re-enter". In addition, the number of authentications may be limited. For example, the daily maximum number of authentications is 3 times. in response to the current user fails to authenticate 1-2 times, a prompt "Authentication failed, please re-enter" will be displayed, in response to the current user fails to authenticate 3 times, a prompt "The input limit has been reached today, please try again tomorrow" will be displayed.

In the device control method provided by embodiments of the present disclosure, during a target application runs, in response to it is determined that device usage time information of a current user meets a preset blocking trigger condition, a preset blocking page is displayed on a current operation interface of the target application; wherein the preset blocking page is used to block a trigger operation on the current operation interface, and an authentication control is disposed on the preset blocking page. In response to a trigger operation on the authentication control, the current user is authenticated, and in response to it is determined that the authentication of the current user is successful, the preset blocking page is closed. The present disclosure judges the device usage time information of the current user based on the preset blocking trigger condition, controls the preset blocking page by authenticating the current user, prevents the current user from using the device for too long, and helps the current user to develop good device usage habits.

In some embodiments of the present disclosure, blocking cut-off information may be displayed on a preset blocking page, and in response to it is determined that the current user meets the preset blocking cut-off condition, the preset blocking page is closed.

Among them, the preset blocking cut-off condition and the blocking cut-off time information have a corresponding relationship therebetween. Specifically, the preset blocking cut-off condition includes that a blocking duration reaches a preset first duration threshold and/or the current time reaches a preset blocking cut-off time, assuming that the preset blocking cut-off condition includes that the blocking duration reaches the preset first duration threshold, the corresponding blocking cut-off time information includes the preset first duration threshold, for example, the blocking cut-off time information displayed on the preset blocking page includes 6 hours, which means that the preset blocking page will be closed after 6 hours; assuming that the preset blocking cut-off condition includes that the current time reaches the preset blocking cut-off time, the corresponding blocking cut-off time information includes the preset blocking cut-off time, for example, the blocking cut-off time information displayed on the preset blocking page includes 6 o'clock tomorrow morning, which means that the preset blocking page will be closed at 6 o'clock tomorrow morning.

It should be noted that the preset first duration threshold and the preset blocking cut-off time can be set as needed, and the present disclosure does not make any limitation thereto.

Figure 4:
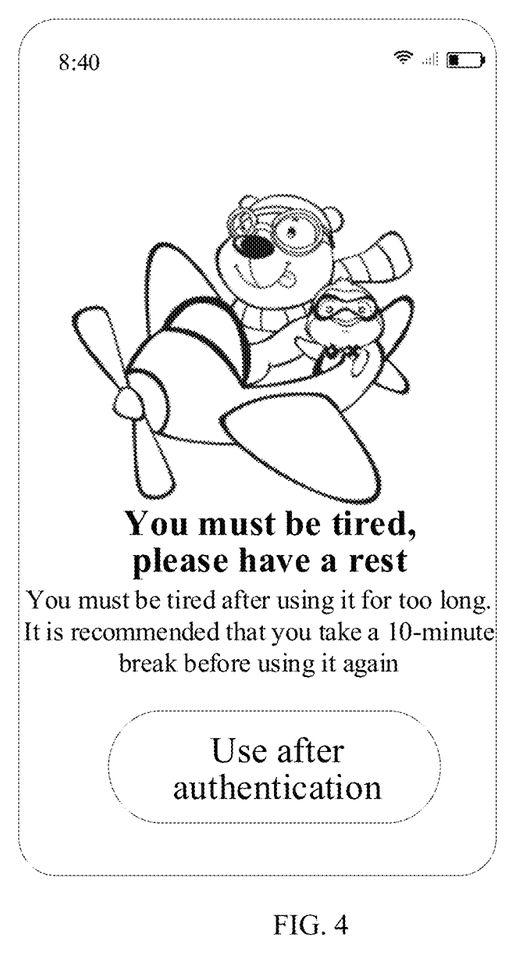
FIG. 4 is a schematic diagram of another preset blocking page provided by an embodiment of the present disclosure.

FIG. 4 is a schematic diagram of another preset blocking page according to an embodiment of the present disclosure, in response to it is determined that the device usage time information of the current user meets a preset blocking trigger condition, a preset blocking page is displayed. The preset blocking page displays blocking duration reminder information, such as "You must be tired after using it for too long. It is recommended that you take a 10-minute break before using it again", in response to the blocking duration exceeds 10 minutes, the preset blocking page is closed. In addition, the preset blocking page may also have been provided with a blocking duration countdown control, to remind the current user how much time is left before closing the preset blocking page.

Figure 5:
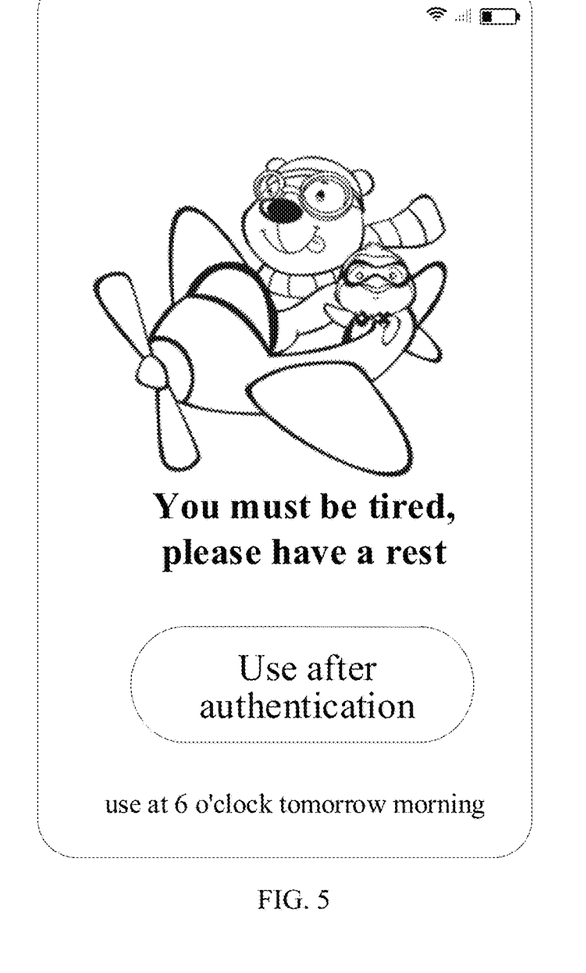
FIG. 5 is a schematic diagram of yet another preset blocking page provided by an embodiment of the present disclosure.

FIG. 5 is a schematic diagram of yet another preset blocking page according to an embodiment of the present disclosure. In response to it is determined that the device usage time information of the current user meets a preset blocking trigger condition, the preset blocking page is displayed, and blocking cut-off time reminder information is set at the bottom of the preset blocking page, such as words "Use at 6 o'clock tomorrow morning", therefore, when the current time is 6 o'clock tomorrow morning, the preset blocking page will be automatically closed.

It should be noted that even if the current user's device changes the preset blocking cut-off time, the preset blocking page still cannot be closed, preventing the current user from escaping by arbitrarily changing the device time.

In some embodiments of the present disclosure, in response to it is determined that the current user is an application APP uninstall-reinstall login user or a change-device login user, then judging whether the current user is in a blocked state; in response to it is determined that the current user is in the blocked state, displaying the preset blocking page, and hiding the authentication control disposed on the preset blocking page.

Among them, the blocked state is used to represent a state entered in response to the device usage time information of the current user meets the preset blocking trigger condition; the application APP uninstall-reinstall login user refers to a user who deletes the target APP in the same device and then reinstalls it on the device; the change-device login user refers to a user who uses different devices to log in the target APP under the same account.

In an actual application, in response to it is determined that the current user belongs to the application APP uninstall-reinstall login user or the change-device login user, it is necessary to determine whether the current user is in a blocked state.

In some embodiments of the present disclosure, determining whether the current user is in a blocked state may be to determine whether the device usage time information of the current user meets a preset blocking trigger condition. In response to it is determined that the device usage time information of the current user meets the preset blocking trigger condition, which means that the current user is in a blocked state, at this time, the preset blocking page is displayed and access to the target APP is not allowed, preventing the current user from escaping by uninstalling and then reinstalling the application APP or changing the device to close the preset blocking page.

In some embodiments of the present disclosure, judging whether the current user is in a blocked state may also be to determine whether the current user has a blocking label, specifically, the blocking label may be labelled for the current user when determining the device usage time information of the current user meets a preset blocking trigger condition. In response to it is determined that the current user has a blocking label, which means that the current user is in a blocked state, at this time, the preset blocking page is displayed and access to the target APP is not allowed, preventing the current user from escaping by uninstalling and then reinstalling the application APP or changing the device to close the preset blocking page.

In some embodiments of the present disclosure, in response to it is determined that the current user belongs to an application APP uninstall-reinstall login user or a change-device login user, while the current user is in a blocked state, the authentication control disposed on the preset blocking page can be hidden from displaying, at this time, the current user cannot trigger the closing of the preset blocking page through authentication, and the current user cannot continue to use the target APP, until in response to it is determined that the device usage time information of the current user does not meet the preset blocking trigger conditions, the current user can continue to use the target APP.

In response to it is determined that the device of the current user is not in a blocked state, the current user can continue to use the target APP.

In the device control method provided by embodiments of the present disclosure, by judging whether the application APP uninstall-reinstall login user or the change-device login user is in a blocked state, it is possible to prevent the current user from escaping by uninstalling and then reinstalling the application APP or changing the device to close the preset blocking page.

In order to facilitate further understanding of the device control method provided by embodiments of the present disclosure, an embodiment of the present disclosure will be specifically introduced based on actual application scenarios.

In response to it is determined that the device usage time information of the current user a meets the preset blocking trigger condition, a preset blocking page is displayed. For example, in response to the cumulative usage time of the current user a reaches 8 hours, the preset blocking page is displayed. At this time, the current user a cannot continue to access the target APP corresponding to the device, in response to it needs to continue to access the target APP, the preset blocking page shall be closed, specifically, closing the preset blocking page can be done in the following way.

1. The preset blocking page can be closed by information authentication, for example, authenticating the current user according to the information input by the current user, and in response to the information input by the current user is successfully authenticated, the preset blocking page can be closed, at this time, the current user a can continue to access the target APP.

2. The preset blocking page can be closed in a manner of determining whether the preset blocking cut-off condition is met. In response to it is determined that the current user meets the preset blocking cut-off condition, the preset blocking page is closed, for example, in response to the device blocking duration of the current user a reaches 20 minutes or the device current time of the current user a reaches 6 o'clock, the preset blocking page can be closed, at this time, the current user a can continue to access the target APP.

Figure 6:
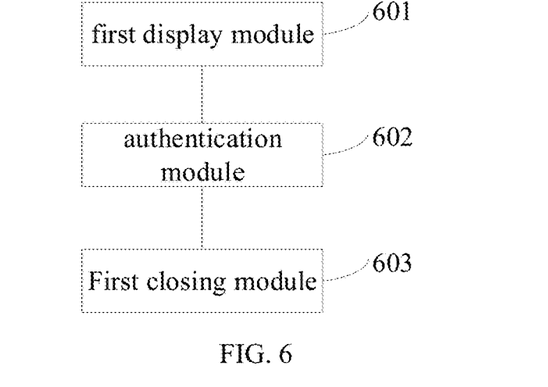
FIG. 6 is a structural schematic diagram of a device control apparatus provided by an embodiment of the present disclosure.

The present disclosure further provides a device control apparatus, referring to FIG. 6 which is a structural schematic diagram of the device control apparatus provided by an embodiment of the present disclosure, the apparatus may include:

a first display module 601 configured to, during a target application runs, in response to it is determined that device usage time information of a current user meets a preset blocking trigger condition, display a preset blocking page on a current operation interface of the target application; wherein the preset blocking page is used to block a trigger operation on the current operation interface, and an authentication control is disposed on the preset blocking page;

an authentication module 602 configured to, in response to a trigger operation on the authentication control, authenticate the current user; and a first closing module 603 configured to, in response to it is determined that the authentication of the current user is successful, close the preset blocking page.

In some embodiments of the present disclosure, the apparatus may further include:

a second display module configured to, in response to it is determined that the authentication of the current user fails, display authentication failure notification information on the preset blocking page.

In some embodiments of the present disclosure, the preset blocking page may display blocking cut-off time information thereon, and the apparatus may further include:

a second closing module configured to, in response to it is determined that the current user meets a preset blocking cut-off condition, close the preset blocking page; wherein there is a corresponding relationship between the preset blocking cut-off condition and the blocking cut-off time information.

In some embodiments of the present disclosure, the preset blocking cut-off condition may include that a blocking duration reaches a preset first duration threshold and/or a current time reaches a preset blocking cut-off time.

In some embodiments of the present disclosure, the device usage time information may include at least one of a cumulative device usage duration, a single continuous device usage duration, and a device usage time; and the preset blocking trigger condition may include at least one of the cumulative device usage duration reaching a preset second duration threshold, the single continuous device usage duration reaching a preset third duration threshold, and the device usage time falling within a preset usage time range.

In some embodiments of the present disclosure, the apparatus may further include:

a judgement module configured to, in response to it is determined that the current user is an application APP uninstall-reinstall login user or a change-device login user, then judge whether the current user is in a blocked state; wherein the blocked state is used to represent a state entered in response to the device usage time information of the current user meets the preset blocking trigger condition; and a third display module configured to, in response to it is determined that the current user is in the blocked state, display the preset blocking page, and hide the authentication control disposed on the preset blocking page.

In the device control apparatus provided by embodiments of the present disclosure, during a target application runs, in response to it is determined that device usage time information of a current user meets a preset blocking trigger condition, a preset blocking page is displayed on a current operation interface of the target application; wherein the preset blocking page is used to block a trigger operation on the current operation interface, and an authentication control is disposed on the preset blocking page. In response to a trigger operation on the authentication control, the current user is authenticated, and in response to it is determined that the authentication of the current user is successful, the preset blocking page is closed. The present disclosure judges the device usage time information of the current user based on the preset blocking trigger condition, controls the preset blocking page by authenticating the current user, prevents the current user from using the device for too long, and helps the current user to develop good device usage habits.

It should be noted that the above-mentioned modules are only logical modules divided according to the specific functions they realize, instead of being used to limit specific implementation, for example, they can be implemented in software, hardware, or a combination of software and hardware. In actual implementation, each of the above modules may be implemented as an independent physical entity, or may also be implemented by a single entity (for example, a processor (CPU or DSP, etc.), an integrated circuit, etc.). In addition, the above-mentioned modules are shown with dotted lines in the drawings to indicate that these modules may not actually exist, and the operations/functions they realized may be implemented by the apparatus or the processing circuit itself.

In addition, although not shown, the apparatus may also include a memory that can store various information generated by the apparatus, various modules included in the apparatus during operation, programs and data for operations, data to be transmitted by the communication unit, etc. The memory can be volatile memory and/or non-volatile memory. For example, memory may include, but is not limited to, random access memory (RAM), dynamic random-access memory (DRAM), static random-access memory (SRAM), read only memory (ROM), flash memory. Of course, the memory could also be located outside the apparatus.

In addition to the above-mentioned method and apparatus, embodiments of the present disclosure may further provide a computer-readable storage medium having instructions stored therein, wherein the instructions, when running on a terminal device, causes the terminal device to implement the device control method as described in embodiments of the present disclosure.

Embodiments of the present disclosure may further provide a device control device, comprising: a memory, a processor, wherein the memory stores computer programs thereon; wherein the computer programs, when executed by the processor, cause the device control device to implement the device control method as described in embodiments of the present disclosure.

Embodiments of the present disclosure may further provide a computer program product having computer programs/instructions, wherein the computer programs/instructions, when executed by a processor, causes implementation of the device control method as described in embodiments of the present disclosure.

Embodiments of the present disclosure may further provide a computer program comprising program codes, which, when executed by a processor, cause implementation of the device control method as described in embodiments of the present disclosure.

Figure 7:
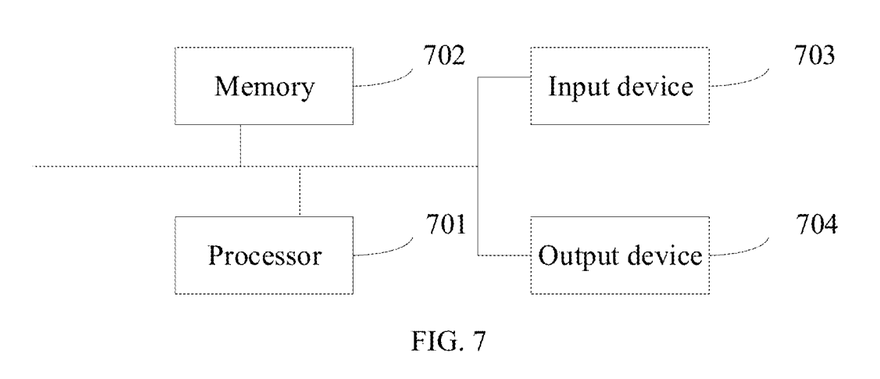
FIG. 7 is a structural schematic diagram of a device control device provided by an embodiment of the present disclosure.

In addition, an embodiment of the present disclosure further provides a data control device, as shown in FIG. 7, the data control device may include:

a processor 701, a memory 702, an input device 703, and an output device 704. There may be one or more processors 701 in the data control device, and FIG. 7 takes one processor as an example. In some embodiments of the present disclosure, the processor 701, the memory 702, the input apparatus 703, and the output apparatus 704 may be connected by using a bus or other manners, wherein FIG. 7 takes the bus connection as an example.

The memory 702 may be configured to store software programs and modules, and the processor 701 may execute various functional applications and data processing of the data control device, by running the software programs and the modules stored in the memory 702. The memory 702 may mainly include a program storage area and a data storage area, wherein the program storage area may store an operating system, an application program required by at least one function, and the like. In addition, the memory 702 may include a high-speed random-access memory, and may further include a non-volatile memory, for example, at least one magnetic disk storage device, a flash memory device, or another volatile solid-state storage device. The input device 703 may be configured to receive input digit or character information, and generate signal inputs related to user setting and function control for the data control device.

Specifically, in this embodiment, the processor 701 loads executable files corresponding to processes of one or more applications into the memory 702 according to the following instructions, and runs the applications stored in the memory 702 by the processor 701, to implement various functions of the data control device.

It should be noted that, in this specification, relational terms such as "first" and "second" are only used to distinguish one entity or operation from another entity or operation, and do not necessarily require or imply that there is any actual relationship or order between these entities or operations. Moreover, the terms "include", "comprise" or any other variations thereof are intended to cover a non-exclusive inclusion, so that a process, method, article, or device that includes a series of elements not only includes those elements, but also includes other elements not explicitly listed, or further includes elements inherent to the process, method, article, or device. In the absence of more restrictions, the element defined by the statement "includes one . . . " does not preclude the existence of additional identical elements in the process, method, article, or device that includes the element.

The foregoing descriptions are merely specific implementations of the present disclosure, so as to enable a person skilled in the art to understand or implement the present disclosure. Various modifications to these embodiments will be readily apparent to those skilled in the art, and the generic principles defined herein may be implemented in other embodiments without departing from the spirit or scope of the disclosure. Thus, the present disclosure will not be limited to the embodiments described herein, but is to be accorded the widest scope consistent with the principles and novel features disclosed herein.

What is claimed is:
1. A device control method, comprising:
during a target application runs, in response to it is determined that device usage time information of a current user meets a preset blocking trigger condition, displaying a preset blocking page on a current operation interface of the target application; wherein the preset blocking page is used to block a trigger operation on the current operation interface, and an authentication control is disposed on the preset blocking page;
in response to a trigger operation on the authentication control, authenticating the current user;
in response to it is determined that the authentication of the current user is successful, closing the preset blocking page,
wherein the preset blocking page displays blocking cut-off time information thereon, and the method further comprises:
in response to it is determined that the current user meets a preset blocking cut-off condition, closing the preset blocking page; wherein there is a corresponding relationship between the preset blocking cut-off condition and the blocking cut-off time information.

2. The method of claim 1, wherein the method further comprises:
in response to it is determined that the authentication of the current user fails, displaying authentication failure notification information on the preset blocking page.

3. The method of claim 1, wherein the preset blocking cut-off condition includes that a blocking duration reaches a preset first duration threshold and/or a current time reaches a preset blocking cut-off time.

4. The method of claim 1, wherein, the device usage time information includes at least one of a cumulative device usage duration, a single continuous device usage duration, and a device usage time; the preset blocking trigger condition includes at least one of the cumulative device usage duration reaching a preset second duration threshold, the single continuous device usage duration reaching a preset third duration threshold, and the device usage time falling within a preset usage time range.

5. The method of claim 1, wherein the method further comprises:
in response to it is determined that the current user is an application APP uninstall-reinstall login user or a change-device login user, then judging whether the current user is in a blocked state; wherein the blocked state is used to represent a state entered in response to the device usage time information of the current user meets the preset blocking trigger condition;
in response to it is determined that the current user is in the blocked state, displaying the preset blocking page, and hiding the authentication control disposed on the preset blocking page.

6. The method of claim 1, wherein, in response to it is determined that the device usage time information of the current user meets the preset blocking trigger condition, or in response to it is determined that the current user has a blocking label, it is determined that the current user is in a blocked state, wherein the blocking label is labelled for the current user when the device usage time information of the current user meets the preset blocking trigger condition.

7. A non-transitory computer-readable storage medium having instructions stored thereon, wherein the instructions, when running on a terminal device, causes the terminal device to implement:
during a target application runs, in response to it is determined that device usage time information of a current user meets a preset blocking trigger condition, displaying a preset blocking page on a current operation interface of the target application; wherein the preset blocking page is used to block a trigger operation on the current operation interface, and an authentication control is disposed on the preset blocking page;
in response to a trigger operation on the authentication control, authenticating the current user;
in response to it is determined that the authentication of the current user is successful, closing the preset blocking page,
wherein the preset blocking page displays blocking cut-off time information thereon, and wherein the instructions, when running on a terminal device, causes the terminal device to further implement:
in response to it is determined that the current user meets a preset blocking cut-off condition, closing the preset blocking page; wherein there is a corresponding relationship between the preset blocking cut-off condition and the blocking cut-off time information.

8. The non-transitory computer-readable storage medium of claim 7, wherein the instructions, when running on a terminal device, causes the terminal device to further implement:
in response to it is determined that the authentication of the current user fails, displaying authentication failure notification information on the preset blocking page.

9. The non-transitory computer-readable storage medium of claim 7, wherein the preset blocking cut-off condition includes that a blocking duration reaches a preset first duration threshold and/or a current time reaches a preset blocking cut-off time.

10. The non-transitory computer-readable storage medium of claim 7, wherein, the device usage time information includes at least one of a cumulative device usage duration, a single continuous device usage duration, and a device usage time; the preset blocking trigger condition includes at least one of the cumulative device usage duration reaching a preset second duration threshold, the single continuous device usage duration reaching a preset third duration threshold, and the device usage time falling within a preset usage time range.

11. The non-transitory computer-readable storage medium of claim 7, wherein the instructions, when running on a terminal device, causes the terminal device to further implement:
in response to it is determined that the current user is an application APP uninstall-reinstall login user or a change-device login user, then judging whether the current user is in a blocked state; wherein the blocked state is used to represent a state entered in response to the device usage time information of the current user meets the preset blocking trigger condition;
in response to it is determined that the current user is in the blocked state, displaying the preset blocking page, and hiding the authentication control disposed on the preset blocking page.

12. The non-transitory computer-readable storage medium of claim 7, wherein, in response to it is determined that the device usage time information of the current user meets the preset blocking trigger condition, or in response to it is determined that the current user has a blocking label, it is determined that the current user is in a blocked state, wherein the blocking label is labelled for the current user when the device usage time information of the current user meets the preset blocking trigger condition.

13. A device control device, comprising: a memory, a processor, wherein the memory stores computer programs thereon; wherein the computer programs, when executed by the processor, cause the device control device to implement:
during a target application runs, in response to it is determined that device usage time information of a current user meets a preset blocking trigger condition, displaying a preset blocking page on a current operation interface of the target application; wherein the preset blocking page is used to block a trigger operation on the current operation interface, and an authentication control is disposed on the preset blocking page;

in response to a trigger operation on the authentication control, authenticating the current user;

in response to it is determined that the authentication of the current user is successful, closing the preset blocking page, wherein the preset blocking page displays blocking cut-off time information thereon, and wherein the computer programs, when executed by the processor, cause the device control device to further implement:

in response to it is determined that the current user meets a preset blocking cut-off condition, closing the preset blocking page; wherein there is a corresponding relationship between the preset blocking cut-off condition and the blocking cut-off time information.

14. The device control device of claim 13, wherein the computer programs, when executed by the processor, cause the device control device to further implement:

in response to it is determined that the authentication of the current user fails, displaying authentication failure notification information on the preset blocking page.

15. The device control device of claim 13, wherein the preset blocking cut-off condition includes that a blocking duration reaches a preset first duration threshold and/or a current time reaches a preset blocking cut-off time.

16. The device control device of claim 13, wherein, the device usage time information includes at least one of a cumulative device usage duration, a single continuous device usage duration, and a device usage time; the preset blocking trigger condition includes at least one of the cumulative device usage duration reaching a preset second duration threshold, the single continuous device usage duration reaching a preset third duration threshold, and the device usage time falling within a preset usage time range.

17. The device control device of claim 13, wherein the computer programs, when executed by the processor, cause the device control device to further implement:

in response to it is determined that the current user is an application APP uninstall-reinstall login user or a change-device login user, then judging whether the current user is in a blocked state; wherein the blocked state is used to represent a state entered in response to the device usage time information of the current user meets the preset blocking trigger condition;

in response to it is determined that the current user is in the blocked state, displaying the preset blocking page, and hiding the authentication control disposed on the preset blocking page.

18. The device control device of claim 13, wherein, in response to it is determined that the device usage time information of the current user meets the preset blocking trigger condition, or in response to it is determined that the current user has a blocking label, it is determined that the current user is in a blocked state, wherein the blocking label is labelled for the current user when the device usage time information of the current user meets the preset blocking trigger condition.

* * * * *